(12) United States Patent
Chiga

(10) Patent No.: US 6,736,273 B2
(45) Date of Patent: May 18, 2004

(54) FILTER FOR FLUIDS, ESPECIALLY FUELS

(75) Inventor: Antonio Chiga, Dammartin en Goele (FR)

(73) Assignee: Filtertek Inc., Hebron, IL (US)

( * ) Notice: Subject to any disclaimer, the term of this patent is extended or adjusted under 35 U.S.C. 154(b) by 0 days.

(21) Appl. No.: 10/071,865

(22) Filed: Feb. 8, 2002

(65) Prior Publication Data

US 2002/0162790 A1 Nov. 7, 2002

(30) Foreign Application Priority Data

Feb. 8, 2001 (DE) ..................................... 201 02 217 U

(51) Int. Cl.⁷ ............................................... B01D 29/15
(52) U.S. Cl. .................... 210/461; 210/172; 210/323.1; 210/416.4; 210/486; 210/499
(58) Field of Search .............................. 210/172, 323.1, 210/416.4, 459, 460, 461, 462, 463, 486, 499, 316, 317

(56) References Cited

U.S. PATENT DOCUMENTS

| | | |
|---|---|---|
| 1,235,438 A | 7/1917 | Chynoweth |
| 2,381,949 A | 8/1945 | Goodloe et al. |
| 3,826,372 A | 7/1974 | Bell |
| 4,077,887 A | 3/1978 | Langvik |
| 4,159,951 A | 7/1979 | Davis |
| 4,312,753 A | 1/1982 | Bell |
| 4,420,396 A | 12/1983 | Yamamoto et al. |
| 4,561,977 A | 12/1985 | Sasaki |
| 4,617,121 A | 10/1986 | Yokoyama |
| 4,618,422 A | 10/1986 | Sasaki et al. |

(List continued on next page.)

FOREIGN PATENT DOCUMENTS

| | | |
|---|---|---|
| DE | 814 362 | 9/1951 |
| DE | 925 712 C | 8/1954 |
| DE | 26 58 358 C3 | 6/1978 |
| DE | 34 08 520 A1 | 9/1984 |
| DE | 39 14938 C1 | 10/1990 |
| DE | 41 02 474 A1 | 8/1992 |
| DE | 295 18 501 U1 | 2/1996 |
| EP | 0 369 039 A1 | 5/1990 |
| EP | 0 400 170 A1 | 12/1990 |
| EP | 0 475 610 B1 | 3/1992 |
| EP | 0 542 547 B1 | 5/1993 |
| EP | 0 901 571 B1 | 3/2000 |
| JP | 62 41962 | 7/1987 |
| WO | WO 97/46800 | 12/1997 |
| WO | WO 00/03784 | 1/2000 |

OTHER PUBLICATIONS

Guibet, Jean–Claude, "Replacement Fuels: Directions and Research in French", XX Fisita Congress, 1984, pp. 2154–2161 original and translation in English.

*Primary Examiner*—Matthew O. Savage
(74) *Attorney, Agent, or Firm*—Steven P. Shurtz; Brinks Hofer Gilson & Lione

(57) ABSTRACT

A vehicle fuel filter for mounting to a fuel pump in a fuel tank comprises a tubular body having an axis, a first end and a second end opposite the first end; a pump connection neck positioned on the first end of the tubular body and having a filter outlet opening for mounting the filter on a fuel pump intake tube, the filter outlet opening having an axis at a substantially right angle to the axis of the tubular body; an inlet opening on the second end of the tubular body, the inlet opening extending axially in the direction of the axis of the tubular body; an envelope of filter fabric surrounding the inlet opening such that fuel entering into the envelope can pass into the tubular body through the inlet opening; and a supporting body fixedly connected to the tubular body at the second end and at a predetermined angle to the tubular body, at least a portion of the supporting body preventing the filter envelope from collapsing.

21 Claims, 2 Drawing Sheets

U.S. PATENT DOCUMENTS

| | | |
|---|---|---|
| 4,743,370 A | 5/1988 | Mizusawa |
| 4,772,044 A | 9/1988 | Booher |
| 4,783,260 A | 11/1988 | Kurihara |
| 4,851,118 A | 7/1989 | Kurihara |
| 4,874,510 A | 10/1989 | Akira et al. |
| 4,961,850 A | 10/1990 | Combest |
| 5,049,271 A | 9/1991 | Cain |
| 5,055,187 A | 10/1991 | Ito et al. |
| 5,084,166 A | 1/1992 | Shiraga et al. |
| 5,169,531 A | 12/1992 | Shiraga et al. |
| 5,174,841 A | 12/1992 | Combest |
| 5,547,568 A | 8/1996 | Sasaki |
| 5,665,229 A * | 9/1997 | Fitzpatrick et al. ......... 210/232 |
| 5,795,468 A | 8/1998 | Reising et al. |
| 5,876,599 A * | 3/1999 | Sylvester et al. ........... 210/232 |
| 5,928,507 A | 7/1999 | Chiga |
| 6,176,133 B1 * | 1/2001 | Hutter et al. ................. 73/306 |

\* cited by examiner

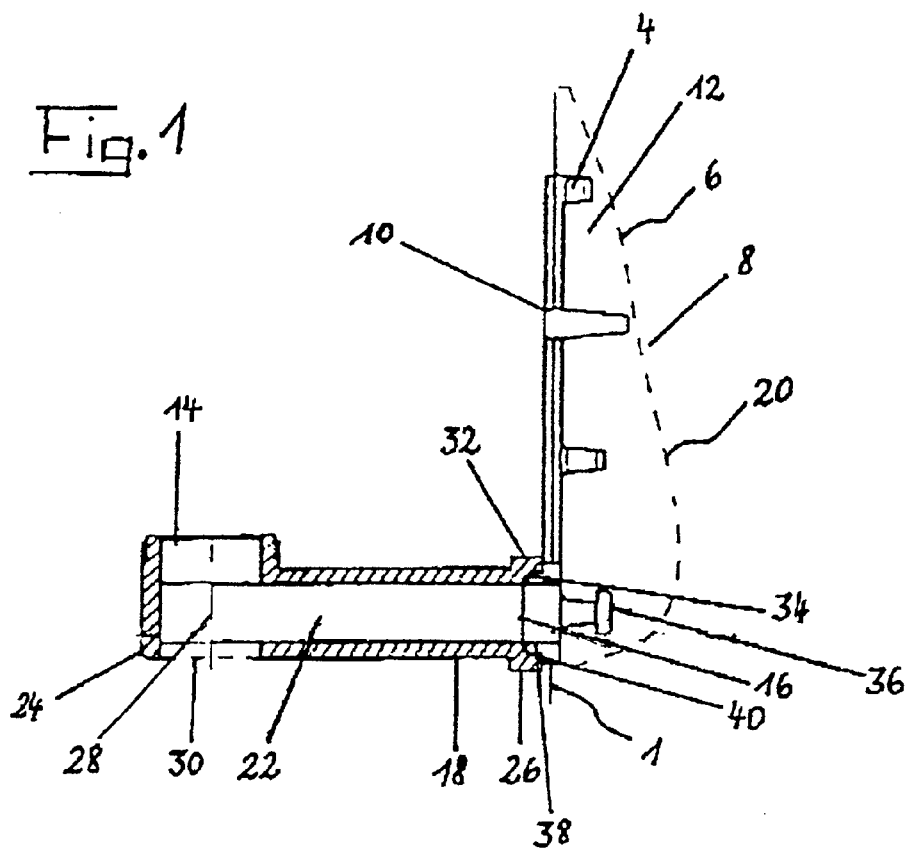
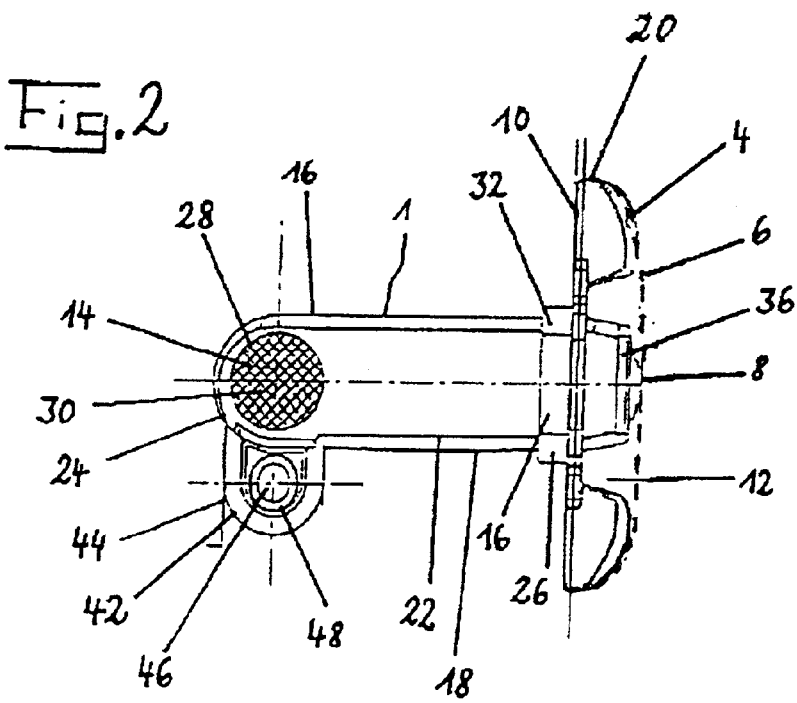

FILTER FOR FLUIDS, ESPECIALLY FUELS

BACKGROUND OF THE INVENTION

The invention relates to a filter for fluids, especially fuels, having a body supporting a filter fabric and which serves to keep opposed sides of the filter body formed by the filter fabric spaced a distance from one another and having a pump connection neck positioned on the exterior of the filter body. The interior of the filter body has an inlet opening. The supporting body is completely enclosed by the filter fabric and has a connection to the exterior via the inlet opening and a pump connection neck. The filter has a first part containing the pump connection neck and at least one second part positioned in an angle with respect to the first part.

A filter of this kind is shown in PCT Publication No. WO 00/03784. In this known filter, the first part and the second part together form the filter body, wherein the two parts are connected to one another by the means of a joint. The second part and the first part (together with the filter fabric) can be folded from a straight starting position into an angular position, and by the means of a locking device can be fixed in the angular position. Filters of this kind should have a construction as simple as possible. Fuel filters are intended to be mounted in the fuel tank of vehicles. The filter function here is performed by the filter fabric, wherein the supporting body is serving to keep the opposed sides of the filter body formed by the filter fabric at a distance from one another since otherwise both sides could partly stick together, whereby the filter area presented would be decreased. The above described filter makes it possible to have a largest possible filter area in a smallest possible space, wherein especially in connection with fuel filters the known filter can be positioned in an extremely small suction space such that a complete emptying of the fuel from the fuel container is possible. By the construction according to which the two parts are extending in an angle, especially in a right angle to each other, the filter demands an extremely small space in spite of a large filter area.

Starting out from the known filter of the above defined kind, it is the task to be solved by the present invention to drastically simplify the design and construction of the filter while maintaining all advantages such that the production costs of the filter, too, can be drastically decreased.

BRIEF SUMMARY OF THE INVENTION

This task is solved in a filter of the above defined kind basically by the features that the first part is formed by a tubular body which on its first end has the pump connection neck extending generally in a right angle with respect to the main axis of the tubular body and which, on it second end, is provided with an axially extending inlet opening. The second part of the filter is formed of a filter body comprised of a supporting body and the filter fabric. The filter body is fixedly connected in a predetermined angular position with respect to the tubular body.

In a first aspect the invention is a vehicle fuel filter for mounting to a fuel pump in a fuel tank comprising a tubular body having an axis, a first end and a second end opposite the first end; a pump connection neck positioned on the first end of the tubular body and having a filter outlet opening for mounting the filter on a fuel pump intake, the filter outlet opening having an axis at a substantially right angle to the axis of the tubular body; an inlet opening on the second end of the tubular body, the inlet opening extending axially in the direction of the axis of the tubular body; an envelope of filter fabric surrounding the inlet opening such that fuel entering into the envelope can pass into the tubular body through the inlet opening; and a supporting body fixedly connected to the tubular body at the second end and at a predetermined angle to the tubular body, at least a portion of the supporting body preventing the filter envelope from collapsing.

The preferred filter of the invention has a two-part construction formed from the first part as a simple tubular body, which is fixedly connected with the actual filter body (which forms the second part of the filter) in a chosen angular position corresponding to the demands of the use, instead of a comparatively complicated joint section. The simple tubular body enables an almost complete emptying of the fuel tank because the filter also includes an intake opening opposite to the pump connection neck, with filter fabric fixed therein. With this additional intake opening, the suction distance of the filter is decreased to almost one quarter, whereby, for example, an engine in the starting phase can start-up more quickly. Further, this additional intake opening has the advantage that the fuel tank can be emptied down to the level of said intake opening.

In a preferred embodiment according to the invention, the intake opening has at least the cross-section of the pump connection neck. The flow from the intake opening to the pump is improved by this feature.

In spite of the fact that, according to the field of use, many deliberate shapes of the cross-section are possible, according to an embodiment of the invention it is further preferred that the tubular body has an rectangular cross-section. This has the advantage of a simple construction of the pump connection neck and of a flat filter area in the intake opening.

It is further preferred that the supporting body is injection molded onto the filter fabric forming one side of the filter body. This simplifies the production of the filter.

It is further preferred that the filter fabric forming the other side of the filter body be connected with the filter fabric forming the one side of the filter body by a weld forming part or all of the circumference of the filter body. This further simplifies the method of production.

An especially preferred embodiment of the invention uses a tubular body that has a reinforcement at the inlet opening. The reinforcement surrounds the inlet opening and forms an interior shoulder. The connection piece of the filter abuts the interior shoulder in such a way that the free cross-section for the flow in the inlet opening remains unchanged.

It is preferred that the connection piece be permanently fixed on the inlet opening of the tubular body by ultrasonic welding or the like.

To further simplify the production, the outer interior edge of the inlet opening preferably has an inlet bevel.

A further especially preferred embodiment of the invention includes a clamping device next to the pump connection neck on the exterior of the tubular body for mounting the filter on the suction side of a pump.

This clamping device preferably has a unitary lateral projection of the tubular body and is formed by a slot surrounded by a downwardly extending skirt, wherein the skirt has a slight conicity. The conicity preferably is about 3°.

This preferred embodiment of the clamping device has the advantage that the mounting of the filter on the suction side of a pump is substantially simplified compared with the prior art because the tubular body and projection are made of suitable artificial resin. The resilient properties of the conically designed skirt are sufficient to safely fix the filter on the pump connector on the suction side of the pump by simply sliding the slot over a plug or the like provided on the pump. In prior art constructions it was necessary to form a pocket into which a metal clip was inserted, which had to be secured against falling out by an additional step.

BRIEF DESCRIPTION OF THE DRAWINGS

The invention is more fully described with reference to an exemplary embodiment shown in the drawings, in which:

FIG. 1 is a partly schematically lateral view in cross-section of a preferred embodiment of the filter of the invention, taken along line I—I of FIG. 3;

FIG. 2 is a bottom view of the filter of FIG. 1, wherein the filter fabric is shown in cross-section;

DETAILED DESCRIPTION OF THE DRAWINGS AND PREFERRED EMBODIMENT OF THE INVENTION

Figure 3:
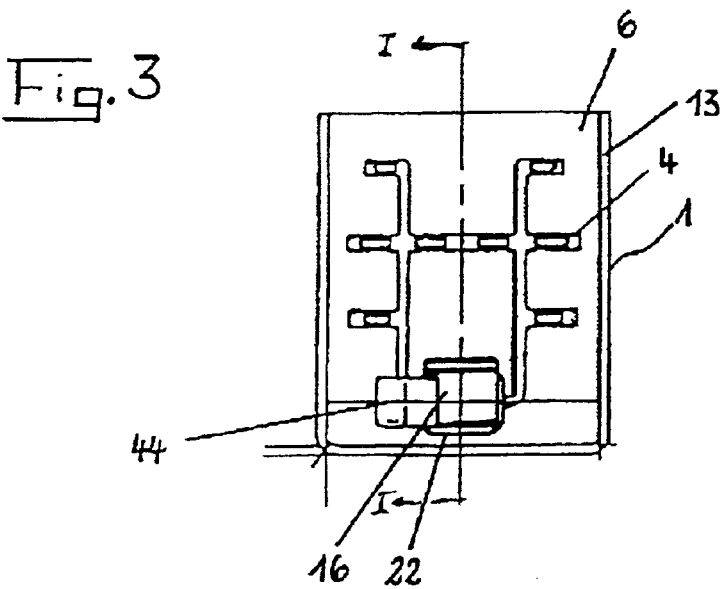
FIG. 3 is a front view of the filter of FIG. 1.
Figure 4:
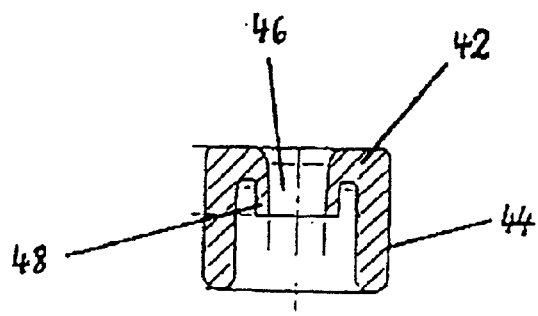
FIG. 4 is a cross-sectional view taken along line IV—IV of FIG. 5 of the clamping device of the filter of FIGS. 1 to 3 in an enlarged scale.
Figure 5:
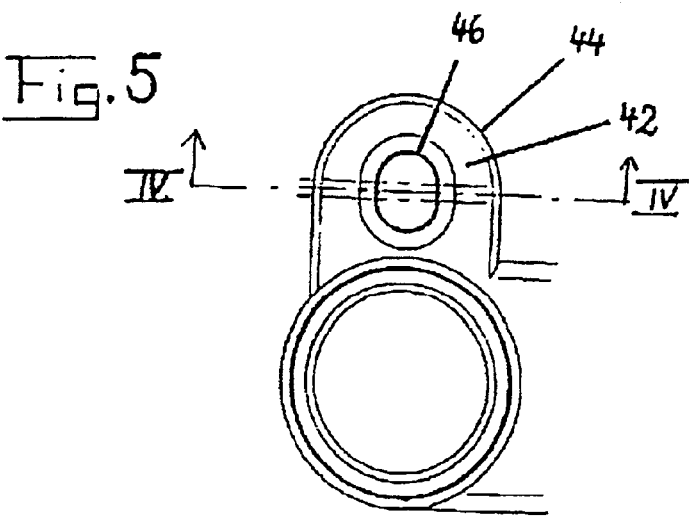
FIG. 5 is a top view of the area of the clamping device according to FIG. 4, also in an enlarged scale.

The filter 1 for fluids, especially fuels, shown in the drawings in all details is made of an artificial resin suitable for this purpose. Filter 1 comprises a supporting body 4, which supports a plastic filter fabric or mesh 6 to keep the opposed sides 8 and 10 of a filter body formed by the filter fabric 6 in a spaced apart relationship from each other to prevent filter 1 from collapsing during use.

On the exterior of the filter, a pump connection neck 14 of usual construction is provided which has an inlet opening 16 in the interior of the filter body 12, formed by the filter fabric 6 and the supporting body 4.

The supporting body 4 is completely enclosed in the filter fabric 6 and merely is connected with the exterior of filter 1 by the inlet opening 16 and the pump connection neck 14.

As shown, filter 1 is made of two parts 18 and 20 positioned, in the preferred embodiment, at a right angle to each other. The first part 18 includes the pump connection neck 14 and the second part 20 includes the supporting body 4.

In the preferred embodiment of the invention, the first part 18 is formed by a tubular body 22 monolithically formed with the pump connection neck 14. The tubular body 22 as shown in FIG. 3 has a rectangular cross-section. The pump connection neck 14 is formed on the first end 24 of the tubular body 22, positioned at a generally right angle to the main axis of the tubular body 22. The tubular body 22 is provided on its second end 26 with the axially extending inlet opening 16. The tubular body includes an imperforate tubular portion extending between the first end and the second end. As further described below, the filter body 12 is fixed on the second end 26.

Further, the tubular body 22 is provided with an intake opening 28 directly opposite to the pump connection neck 14, which is covered by filter fabric 30. The intake opening 28 can have any desired shape. Preferably it has a circular shape to correspond to the cross-section of the pump connection neck 14. Preferably it has at least the same cross-section as the pump connection neck 14.

In the exemplary embodiment shown in the drawings, the filter body 12 is made of the supporting body 4 and the filter fabric 6. These combined form the second part of the filter 1, which is fixedly connected with the tubular body 22 in the desired angular position with respect to the tubular body 22.

As further can be seen from FIGS. 1 to 3, during the production of the filter body 12 the supporting body 4 is injection molded onto the filter fabric 6, forming the left wall in the view according to FIG. 1, i.e. the one side 10 of the filter body 12. The opposite wall, i.e. the other side 8 of the filter body 12, is formed by folding the filter fabric 6 and welding it at the edges by the weld 13 shown in FIG. 3. In this preferred embodiment, only the filter fabric 6 forms the other side 8 of the filter body 12. The filter fabric 6 forms the opposite side 10 of the filter body 12 by the weld 13 running along the three side edges of the filter body 12.

As can be seen from the cross-sectional view according to FIG. 1, the tubular body 22 is provided at the inlet opening 16 with a reinforcement 32 surrounding the inlet opening 16. Reinforcement 32 forms an interior shoulder 34. A connection piece 36 of the filter body 12, which is unitary with the supporting body 4 and which is also injection molded to the side 10 of the filter fabric 6 of the filter body 12, is abutting the interior shoulder 34. The dimensions in this connection are chosen such that the connection between the connection piece 36 and the tubular body 22 is such that the free cross-section of flow in the inlet opening 16 remains unchanged.

The connection piece 36 is preferably permanently fixed to the inlet opening 16 of the tubular body 22 by ultrasonic welding or equivalent means. The desired angular relation between the first part 18 and the second part 20 of filter 1 is predetermined for the corresponding design of the connection piece 36 during the production, according to the geometry of the planned use of filter 1.

To further simplify mounting, the outer interior edge 38 of the inlet opening 16 has an inlet bevel 40.

To mount the filter 1 by means of the pump connection neck 14 on the suction side of a fuel conveying means (not shown), an especially designed clamping device 42 is formed in an unitary lateral projection 44 of the tubular body 22. The clamping device 42 includes a slot 46 surrounded by a downwardly extending skirt 48. The skirt 48 has a downwardly directed slight conicity, which in the exemplary embodiment is about 3°. If the slot 46 with the skirt 48 is pushed onto a plug provided on the fuel conveying means, the conicity of the skirt 48 provides an extremely safe, non-positive connection in a mostly simple way. Since such filters in common practice form a composite construction with the fuel conveying means positioned in the interior of a fuel container of the vehicle (not shown), such a safe connection provides a substantial advantage.

All details and advantages of the invention, which can be seen from the specification, the claims and the drawings, including constructive details and positions in space, for themselves and in any deliberate combination could be important for the invention.

It should be appreciated that the apparatus of the present invention is capable of being incorporated in the form of a variety of embodiments, only one of which has been illustrated and described above. The invention may be embodied in other forms without departing from its spirit or essential characteristics. The described embodiments are to be considered in all respects only as illustrative and not restrictive, and the scope of the invention, therefore, indicated by the appended claims rather than by the foregoing description. All changes which come within the meaning and range of equivalency of the claims are to be embraced within their scope.

What is claimed is:

1. In a filter for fluid fuels, having a supporting body supporting a filter fabric and serving to keep opposite sides of a filter body formed by the filter fabric spaced from one another, and a pump connection neck provided on the exterior of the filter body, which, in the interior of the filter body has an inlet opening, wherein the supporting body is enclosed in the filter fabric and has a connection to the exterior by the inlet opening and the pump connection neck and, wherein the filter has a first part comprising the pump connection neck and at least one second part positioned at an angle with respect to the first part, the improvement comprising the first part being formed by a monolithic tubular body having a main axis and an exterior, which, at its first end, has the pump connection neck positioned in a substantially right angle with respect to the main axis of the tubular body and, which, at its second end, has the axially extending inlet opening, said body including an imperforate tubular portion extending between said first end and said second end, in that the tubular body opposite to the pump connection neck has an intake opening covered by filter fabric, in that the filter body, made of the supporting body and the filter fabric, forms the second part of the filter and the filter body being fixedly connected with the tubular body in a chosen angular position with respect to the same.

2. The filter of claim 1 wherein the intake opening has a cross-sectional area at least as large as that of the pump connection neck.

3. The filter of claim 1 wherein the tubular body has a rectangular cross-section.

4. The filter of claim 1 wherein the supporting body is injection molded onto the filter fabric forming a first side of the filter body.

5. The filter of claim 4 wherein the filter fabric forming a second side of the filter body is connected with the filter fabric forming the first side of the filter body by a weld forming at least a part of the circumference of the filter body.

6. The filter of claim 1 wherein the tubular body has a reinforcement surrounding the inlet opening, which forms an interior shoulder and, wherein a connection piece of the filter body abuts the interior shoulder such that the free cross-section of flow in the inlet opening is unchanged.

7. The filter of claim 6 wherein the connection piece is permanently fixed at the inlet opening of the tubular body by ultrasonic welding.

8. The filter of claim 6 wherein an outer interior edge of the inlet opening has an inlet bevel.

9. The filter of claim 1 wherein a clamping device is located on the exterior of the tubular body next to the pump connection neck for mounting the filter on the suction side of a pump.

10. The filter of claim 9 wherein the clamping device is formed by a unitary lateral projection of the tubular body.

11. The filter of claim 10 wherein the clamping device comprises a slot surrounded by a skirt and wherein the skirt has a slight conicity.

12. The filter of claim 11 wherein the conicity of the skirt is about 3°.

13. A fuel filter comprising:
a) a first part comprising a monolithic tubular body having an axis and
i) a pump connection neck positioned at a substantially right angle with respect to said axis on a first end of the tubular body,
ii) an inlet opening on a second end of the tubular body opposite to the pump connection neck and extending in the direction of the axis of the tubular body; and
iii) said body including an imperforate tubular portion extending between said first end and said second end;
iiii) an intake opening into said tubular body, said intake opening being covered by a filter fabric; and
b) a second part comprising a supporting body inside of a filter fabric envelope holding the filter envelope open, the supporting body being fixedly connected to the tubular body at a predetermined angle, and the axially extending inlet opening providing fluid communication between the interior of the filter envelope and the tubular body.

14. A vehicle fuel filter for mounting to a fuel pump in a fuel tank comprising:
a) a monolithic tubular body surrounding a central axis, a first end and a second end opposite the first end, the second end comprising an inlet opening, said body including an imperforate tubular portion extending between said first end and said second end;
b) a pump connection neck positioned on the first end of the tubular body and having a filter outlet opening facing upwardly for mounting the filter on a fuel pump intake, the filter outlet opening having an axis at a substantially right angle to the axis of the tubular body;
c) an intake opening covered by a filter fabric on the first end of said tubular body;
d) an envelope of filter fabric surrounding the inlet opening such that fuel entering into the envelope can pass into the tubular body through the inlet opening; and
e) a supporting body fixedly connected to the tubular body at the second end and at a predetermined angle to the tubular body, at least a portion of the supporting body preventing the filter envelope from collapsing.

15. The filter of claim 14 wherein the supporting body is injection molded onto the filter fabric forming a first side of the filter body.

16. The filter of claim 15 wherein the filter fabric forming a second side of the filter body is connected with the filter fabric forming the first side of the filter body by a weld forming at least a part of the circumference of the filter body.

17. The filter of claim 14 wherein a clamping device is located on the exterior of the tubular body next to the pump connection neck for mounting the filter on the suction side of a pump.

18. The filter of claim 17 wherein the clamping device is formed by a unitary lateral projection of the tubular body.

19. The filter of claim 18 wherein the clamping device comprises a slot surrounded by a downwardly extending skirt and wherein the skirt has a slight conicity.

20. The filter of claim 14 further comprising an intake opening covered by filter fabric on the first end of the tubular body.

21. The filter of claim 14 further wherein the tubular body is monolithically formed with the pump connection neck.

* * * * *